United States Patent Office 2,707,184
Patented Apr. 26, 1955

2,707,184

CARBONYLOXY STEROIDS

John A. Hogg, Kalamazoo Township, Kalamazoo County, Philip F. Beal, Portage Township, Kalamazoo County, and Frank H. Lincoln, Jr., Kalamazoo Township, Kalamazoo County, Mich., assignors to The Upjohn Company, Kalamazoo, Mich., a corporation of Michigan No Drawing. Application March 30, 1953,
Serial No. 345,676

10 Claims. (Cl. 260—239.55)

This invention relates to a novel class of carbonyloxy steroids, more particularly to certain 3-cyclic ketalized 11-oxygenated - 21 - carbonyloxy-4,17(20)-pregnadiene-3-ones. This application is a continuation-in-part of copending application S. N. 307,385, filed August 30, 1952.

It is an object of the present invention to provide novel 3-cyclic ketalized 3-keto-11-oxygenated-4,17(20)-pregnadiene-21-oic acids and alkyl esters thereof. Other objects will be apparent to those skilled in the art to which this invention pertains.

The compounds of the present invention may be prepared and used in the production of steroids useful as precursors to cortical hormones according to a series of reactions which may be represented as follows:

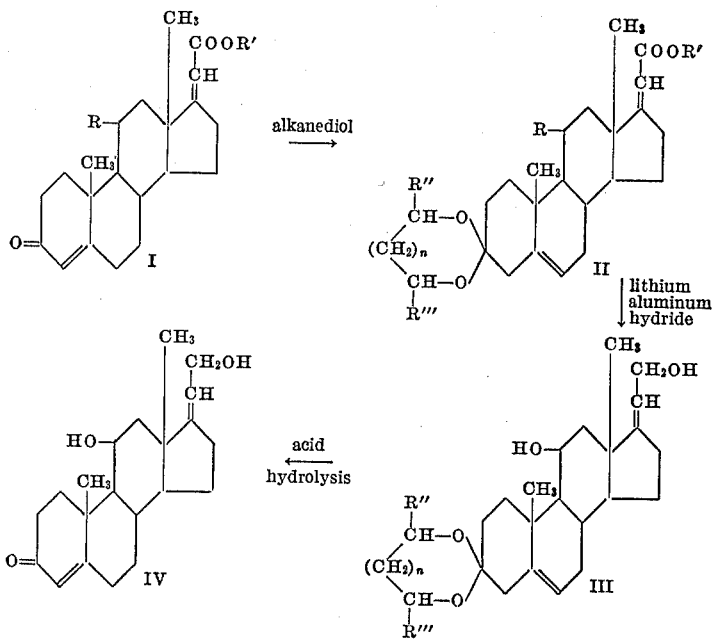

wherein R is an α-hydroxy group, a β-hydroxy group, or a ketonic oxygen (=O), and wherein R', R'', and R''' are hydrogens or alkyl radicals preferably containing from one to eight carbon atoms, inclusive, i. e., loweralkyl, and n is the whole number zero or one. The novel compounds of the present invention may be represented by Formula II above.

According to the method of the present invention, an 11-oxygenated - 21 - carbonyloxy-4,17(20)-pregnadiene-3-one (I) is contacted with an alkane-α-diol or an alkane-β-diol, i. e., a glycol, in the presence of an acid catalyst, to produce a 3-cyclic ketalized 11-oxygenated-21-carbonyloxy-4,17(20)-pregnadiene-3-one (II) of the present invention. The reaction of said ketalized compound with lithium aluminum hydride in an organic solvent therefor followed by a mild aqueous hydrolysis of any excess lithium aluminum hydride or organo-lithium complexes is productive of a 3-ketalized 11,21-dihydroxy-4,17(20)-pregnadiene-3-one (III). Subjecting said latter compound to an aqueous acid hydrolysis is productive of 11,21-dihydroxy-4,17(20)-pregnadiene-3-one (IV) which can be converted to cortisone or 17-hydroxycorticosterone or esters of either of said compounds according to methods illustrated in greater detail in copending application S. N. 307,385, filed August 30, 1952.

The compounds represented by Formula I may be named as 11-oxygenated - 21 - carbonyloxy-4,17(20)-pregnadiene-3-ones or as 3-keto-11-oxygenated-4,17(20)-pregnadiene-21-oic acids and alkyl esters thereof. Similarly, the compounds represented by Formula II may be named as 3-cyclic ketalized 11-oxygenated-21-carbonyloxy-4,17(20)-pregnadiene-3-ones or as 3-cyclic ketalized 3-keto-11-oxygenated-4,17(20)-pregnadiene-21-oic acids and alkyl esters thereof.

An 11,21-dihydroxy-4,17(20)-pregnadiene-3-one represented by Formula IV wherein the 11-hydroxy group has the beta stereoconfiguration, or a 21-ester thereof, is converted to 11β,17α,21-trihydroxy - 4 - pregnene-3,20-dione (Kendall's Compound F) by reaction with osmium tetroxide to produce the 11β,17α,20,21-tetrahydroxy-4-pregnene-3-one osmate ester, or 21-ester thereof, and subsequent oxidation thereof, as with perchloric acid, salts thereof, or other equivalent oxidizing agent such as, for example, hydrogen peroxide, dialkyl peroxides, organic peracids such as peracetic acid or perbenzoic acid, potassium chlorate, or the like, in a solvent such as an ether or an alcohol, e. g., tertiary butyl alcohol or diethyl ether, according to the procedure already known in the art [Prins and Reichstein, Helv. Chim. Acta, 25, 300 (1942); Ruzicka and Mueller, Helv. Chim. Acta, 22, 755 (1939)]

Similarly, starting with 11α,21-dihydroxy-4,17(20)-pregnadiene-3-one (IV) and proceeding through the same reactions described above, and additionally, preferentially oxidizing the 11-hydroxy group to an 11-keto group, e. g., by esterifying the 21-hydroxy group of the 11α,17α,21-trihydroxy-4-pregnene-3,20-dione, obtained in the osmium tetroxide hydroxylation and subsequent oxidation reaction, and then oxidizing the 11α-hydroxy group to an 11-keto group with chromic acid, produces 17α,21-dihydroxy-4-pregnene-3,11,20-trione (Kendall's Compound E).

The starting 11-oxygenated-21-carbonyloxy-4,17(20)-pregnadiene-3-ones are prepared by contacting an 11- oxygenated-21,21-dihalo-21-carbonylprogesterone represented by the following formula:

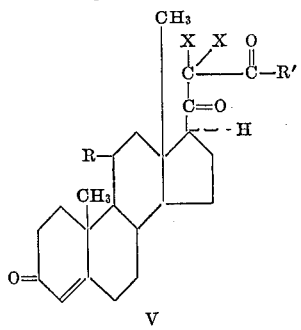

V wherein X is a halogen having an atomic weight from 35 to 127, inclusive, i. e., chlorine, bromine or iodine, wherein R is an α-hydroxy group, a β-hydroxy group, or a ketonic oxygen (=O), wherein R' is hydrogen or a radical having the formula

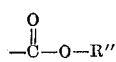

R" being a hydrocarbon radical, with a base, e. g., an alkali-metal alkoxide, in the presence of hydroxy or alkoxy ions to produce a starting 11-oxygenated-21-carbolyloxy-7,17(20)-pregnadiene-3-one (I) according to the method illustrated in the preparations hereinafter and as more fully disclosed in the above-cited copending application.

In carrying out the process of the present invention, a starting steroid (I) described above, is contacted with an alkane-α-diol or an alkane-β-diol, in the presence of an acid catalyst, at a temperature from about room temperature to the boiling point of the reaction solvent employed, for from about one-half hour to about eighteen hours or longer, which time being, if the water of the reaction is concomitantly removed, the time required to remove about a molar equivalent of water per mole of steroid from the reaction mixture. Under these conditions, when the starting steroid is a free acid, the acid group may, to a certain extent, be esterified by the alkanediol to produce a glycol ester thereof. Treatment of the reaction mixture with aqueous or alcoholic base, preferably an alkali-metal base, and then liberating the free acid from the thus-produced salt, taking care to avoid hydrolysis of the ketal radical, is productive of essentially pure product (II) wherein R' is H, i. e., a free acid.

Alkane-α-diols and alkane-β-diols which may be used include ethylene glycol, trimethylene glycol, and alkyl-substituted ethylene glycols and trimethylene glycols, preferably having no more than two alkyl groups substituted thereon, e. g., propane-1,2-diol, butane-1,2-diol, 3-methylbutane-1,2-diol, octane-1,2-diol, butane-2,3-diol, pentane-2,3-diol, 5,5-dimethyloctane-2,3-diol, butane-1,3-diol, pentane-2,4-diol, 4-methylpentane-1,3-diol, octane-1,3-diol, and the like.

Acid catalysts which may suitably be employed in the reaction include anhydrous hydrogen chloride, concentrated sulfuric acid, para-toluenesulfonic acid, benzenesulfonic acid, sulfoacetic acid, and the like, in amounts from a trace to a substantial fraction of a molar equivalent or greater per mole of steriod.

Reaction solvents which may be suitably employed include hydrocarbon solvents, halogenated hydrocarbons, ethers, esters, and the like, such as, for example, benzene, toluene, xylene, hexane, heptane, chloroform, carbon tetrachloride, chlorobenzene, diethyl ether, dioxane, tetrahydrofuran, and others, or an excess of the alkanediol employed.

A suitable method of carrying out the above-described process comprises dissolving the starting steroid and the selected glycol, preferably ethylene glycol, in the selected solvent, preferably a water-immiscible solvent, e. g., benzene, toluene, or carbon tetrachloride, and thereafter heating the reaction mixture, in the presence of the reaction catalyst, at the reflux temperature thereof, with the concomitant removal of the water formed in the reaction, until about a molar equivalent of water per mole of steroid has been removed from the mixture. Reaction times from about one-half hour to several days may sometimes be required to complete the ketalization to a satisfactory extent.

Isolation of the resulting ketalized steroid (II) is conveniently achieved by washing the reaction mixture with dilute base, e. g., dilute aqueous sodium bicarbonate, sodium carbonate, potassium hydroxide, methanolic sodium hydroxide, sodium methoxide or the like, and then distilling the mixture to dryness. When the reaction solvent is substantially water-soluble, the base wash may be performed after the solvent has been removed, or the distillation may be omitted in favor of precipitation of the steroid from the mixture by the addition of a large volume of water, preferably containing enough base to neutralize the catalyst.

Treatment of a 3-cyclic ketalized 3-keto-11-oxygenated-4,17(20)-pregnadiene-21-oic acid or ester thereof (II) with a reducing agent, such as lithium aluminum hydride or the like, is productive of a 3-cyclic ketalized 11,21-dihydroxy-4,17(20)-pregnadiene-3-one (III) wherein the 11-hydroxy group has the alpha or beta configuration.

The lithium aluminum hydride reduction is usually carried out by adding a solution of the selected 3-cyclic ketalized 11-oxygenated-4,17(20)-pregnadiene-21-oic acid or alkyl ester thereof (II) in an organic solvent, which is non-reactive under the conditions of the reaction, to a lithium aluminum hydride solution or suspension in ether. Other solvents which may be used include dioxane, tetrahydrofuran, or the like, as well as other solvents commonly used in lithium aluminum hydride reductions. When ether is used, the reaction is usually carried out at a temperature between about room temperature and the boiling point of the ether, although temperatures substantially below room temperature may sometimes be successfully employed, e. g., from about minus ten to about plus ten degrees centigrade, such temperature sometimes resulting in higher yields of desired product.

Lithium aluminum hydride is usually employed in a substantial chemical equivalent excess to ensure optimum yields of desired product. When the steroid and lithium aluminum hydride have been thoroughly mixed and the heat of reaction has subsided, the reaction is essentially complete. Continued stirring or heating or both are usually employed, however, to ensure completeness of reaction. The excess lithium aluminum hydride and any organolithium complex present is decomposed by the careful addition of water to the reaction mixture. If the reaction mixture is maintained at an alkaline pH, that is, if no acid is added during the decomposition of the lithium aluminum hydride or subsequent thereto, or if an organic acid such as acetic acid, propionic or other weaker acid is employed in the hydrolysis, the corresponding 3-cyclic ketalized 11,21-dihydroxy-4,17(20)-pregnadiene-3-one can be isolated directly from the reaction mixture. This is frequently advantageous since the ketalized steroid is sometimes more readily purified than the free keto steroid. Separating the organic phase from the aqueous phase of the decomposed reaction mixture and then distilling the solvent therefrom leaves a distillation residue consisting essentially of the desired product. The resulting 3-cyclic ketalized 11,21-dihydroxy-4,17(20)-pregnadiene-3-one (III) may be isolated as described above, for example, or further reacted without isolation as more fully disclosed hereinafter.

The free 3-ketone, an 11,21-dihydroxy-4,17(20)-pregnadiene-3-one (IV), is prepared by treatment of a solution of the crude or purified 3-cyclic ketalized 11,21-dihydroxy-4,17(20)-pregnadiene-3-one in an organic solvent with dilute aqueous acid, preferably a mineral acid such as, for example, hydrochloric or sulfuric acid, usually at about room temperature, for from about one-half hour to about 72 hours. The amount of the acid employed is usually from about a trace to a large molar excess and concentrations from extremely dilute to fairly concentrated may be employed since the acid acts only as a catalyst for the hydrolysis. When the hydrolysis product is 11α,21-dihydroxy-4,17(20)-pregnadiene-3-one, the hydrolysis of the 3-cyclic ketal can be carried out under fairly rigorous conditions, i. e., with fairly strong concentration of acid and at temperatures substantially above room temperature, whereas when the hydrolysis product is 11β,21-dihydroxy-4,17(20)-pregnadiene-3-one, the hydrolysis reaction is preferably carried out at about room temperature and in the presence of more dilute acid since the 11β-hydroxy group has a tendency to dehydrate in the presence of acid. The reaction temperature and reaction time required to complete the hydrolysis reaction is somewhat dependent upon the particular 3-ketal group present in the steroid. Isolation of the free 11,21-dihydroxy-4,17(20)-pregnadiene-3-one is conveniently achieved by neutralizing the reaction mixture, distilling the solvent therefrom, or adding a large volume of water thereto if the solvent is water-miscible, and then removing the thus-precipitated product. The thus-isolated 11,21-dihydroxy-4,17(20)-pregnadiene-3-one (IV), after drying, usually does not require purification for subsequent reactions if the starting 3-cyclic ketal was pure.

A convenient procedure for obtaining an 11,21-dihydroxy-4,17(20)-pregnadiene-3-one (IV) from a 3-keto-11-oxygenated-4,17(20)-pregnadiene-21-acid or alkyl ester thereof (I) involves reaction the starting 3-keto-11-oxygenated-4,17(20)-pregnadiene-21-acid or alkyl ester thereof, protected at the 3 position with a 3-ketal, preferably a 3-ethylene glycol ketal (II, R″ and R‴=H, n=1), with a reducing agent, e. g., lithium aluminum hydride, according to the procedure described above and then, after decomposing the excess lithium aluminum hydride with water, hydrolyzing the 3-ketal of the reaction product without isolation. This is conveniently accomplished by adding a mineral acid, preferably hydrochloric acid, to the reaction mixture to render the mixture slightly acidic, and thereafter stirring the acidic reaction mixture for from about one-half hour to about 72 hours to remove the protecting group at the 3 position. Isolation of the thus-produced 11,21-dihydroxy-4,17(20)-pregnadiene-3-one is conveniently achieved by removing the organic layer from the reaction mixture, washing said layer with water or base, and then distilling the solvent therefrom to leave as distillation residue the essentially pure 11,21-dihydroxy-4,17(20)-pregnadiene-3-one (IV).

The following examples are illustrative of the process and products of the present invention but are not to be construed as limiting.

PREPARATION 1.—SODIUM ENOLATE OF 11α-HYDROXY-21-ETHOXYOXALYLPROGESTERONE

Three and three-tenths (3.3) grams of 11α-hydroxyprogesterone, [Peterson and Murray, J. Am. Chem. Soc., 74, 1871 (1952)], was dissolved in a solution of 0.25 gram of sodium in eight milliliters of absolute ethanol, and 1.46 grams of ethyl oxalate was added thereto. The resulting solution was allowed to stand for six hours at room temperature, during which time the color of the solution changed from yellow to brown. The sodium enolate of 11α-hydroxy-21-ethoxyoxalylprogesterone thus-produced was isolated by the addition of a large volume of ether as a yellow amorphous solid which decomposed above 200 degrees centigrade.

PREPARATION 2.—SODIUM ENOLATE OF 11β-HYDROXY-21-ETHOXYOXALYLPROGESTERONE

One hundred and forty-four (144) milligrams (6.25 millimoles) of sodium was dissolved in five milliliters of absolute ethanol under an atmosphere of nitrogen and to this solution were added eight milliliters of benzene and 0.8 milliliter (0.9 gram; 6.15 millimoles) of ethyl oxalate. The mixture was cooled in an ice-water bath and a solution of 1.99 grams (6.03 millimoles) of 11β-hydroxyprogesterone, dissolved in five milliliters of absolute ethanol and mixed with 25 milliliters of dry benzene, was added in a slow stream to the stirred solution. The reaction mixture was stirred at room temperature for 2.5 hours at the end of which time a 100-milliliter portion of ether was added followed by another 100-millliter portion of ether one hour later. The thus-produced pale yellow precipitate was filtered and washed with ether. The yield of 11β-hydroxy-21-ethoxyoxalylprogesterone was 1.68 grams (62 percent).

PREPARATION 3.—SODIUM ENOLATE OF 11-KETO-21-ETHOXYOXALYLPROGESTERONE

To a mixture of 3.4 milliliters of a 3.4 Normal methanolic sodium methoxide solution (0.0116 mole), 0.45 milliliter of absolute ethanol, and twenty milliliters of dry benzene, said mixture previously having been distilled until eight milliliters of distillate had been collected and then cooled, was added 2.3 milliliters (0.0151 mole) of ethyl oxalate and a solution of 3.28 grams (0.01 mole) of 11-ketoprogesterone in 38 milliliters of dry benzene. The solution became turbid and a yellow precipitate formed. The reaction mixture was stirred for ninety minutes, 55 milliliters of ether was then added thereto, and stirring was continued for sixty minutes, whereafter a 130-milliliter portion of ether was added thereto. The thus-formed yellow precipitate of the sodium enolate of 11-keto-21-ethoxyoxalylprogesterone was filtered, washed with several fifty-milliliter portions of ether, and after drying found to weigh 3.65 grams. The ether wash contained 0.54 gram of unreacted 11-ketoprogesterone. The yield of the sodium enolate of 11-keto-21-ethoxyoxalylprogesterone was 81 percent of the theoretical or practically quantitative calculated on the reacted 11-ketoprogesterone. The presence of a sodium enolate was verified by the extreme solubility of the product in water and by a positive ferric chloride test for enols as exhibited by the formation of a bright red color when the product was dissolved in alcoholic and aqueous ferric chloric solutions.

PREPARATION 4.—11α-HYDROXY-21,21-DIBROMO-21-ETHOXYOXALYLPROGESTERONE

To a stirred solution of 4.52 grams (0.01 mole) of the sodium enolate of 11α-hydroxy-21-ethoxyoxalylprogesterone in 150 milliliters of methanol was added dropwise one milliliter (0.02 mole) of bromine. The thus-produced 11α-hydroxy-21,21-dibromo-21-ethoxyoxalylprogesterone is isolated by pouring the reaction mixture into a large volume of water and separating the precipitated product.

PREPARATION 5.—11β-HYDROXY-21,21-DIBROMO-21-ETHOXYOXALYLPROGESTERONE

In exactly the same manner as described in Preparation 4, contacting the sodium enolate of 11β-hydroxy-21-ethoxyoxalylprogesterone with approximately two molar equivalents of bromine is productive of 11β-hydroxy-21,21-dibromo-21-ethoxyoxalylprogesterone.

PREPARATION 6.—11-KETO-21,21-DIBOMO-21-ETHOXYOXALYLPROGESTERONE

To a stirred solution of 4.50 grams (0.01 mole) of the sodium enolate of 11-keto-21-ethoxyoxalylprogesterone and two grams of potassium acetate in seventy milliliters of glacial acetic acid was added 3.09 grams (1.00 milliliter; 0.0193 mole) of bromine dropwise at room temperature. When the addition was complete, the reaction mixture was mixed with a large volume of water. The aqueous layer was then decanted from the precipitated viscous yellow product which was thereafter dissolved in alcohol and re-precipitated as a white solid by the dropwise addition of water. The yield of thus-produced 11-keto-21,21-dibromo-21-ethoxyoxalylprogesterone, after filtering and drying, was 4.0 grams, a yield of seventy percent of the theoretical.

PREPARATION 7.—3-KETO-11α-HYDROXY-4,17(20)-PREGNADIENE-21-OIC ACID METHYL ESTER

To a solution of 29.4 grams (0.05 mole) of 11α-hydroxy-21,21-dibromo-21-ethoxyoxalylprogesterone in 550 milliliters of methanol was added a solution of 16.5 grams (0.3 mole) of sodium methoxide in 500 milliliters of methanol. The reaction mixture was maintained at about 25 degrees centigrade for sixteen hours whereafter an equal volume of water was added thereto and the whole was extracted with about equal portions of first benzene and then two portions of methylene chloride. The combined extracts were dried with anhydrous sodium sulfate and thereafter distilled to remove the solvent therefrom. The distillation residue was dissolved in 500 milliliters of methylene chloride and chromatographed over 875 grams of Florisil synthetic magnesium silicate. The column was developed with 1,250-milliliter portions of solvents of the following composition and order: four of methylene chloride plus five percent acetone, four of methylene chloride plus ten percent acetone, four of methylene chloride plus fifteen percent acetone, two of methylene chloride plus twenty percent acetone, and finally, two of acetone. The methylene chloride plus ten percent acetone eluates and the first methylene chloride plus fifteen percent acetone eluate were combined and the solvent distilled therefrom. The seven grams of distillation residue was recrystallized from a mixture of ethyl acetate and Skellysolve B hexane hydrocarbons to yield crystalline 3-keto-11α-hydroxy-4,17(20)-pregnadiene-21-oic acid methyl ester, melting at 205 to 210 degrees centigrade.

Analysis:
Calculated for C$_{22}$H$_{30}$O$_4$_____ C, 73.75; H, 8.48
Found_____ C, 73.77; H, 8.38
C, 74.10; H, 8.59

Similarly, other 3-keto-11α-hydroxy-4,17(20)-pregnadiene-21-oic acid esters are prepared wherein the ester is methyl, propyl, butyl, amyl, hexyl, heptyl, octyl, or the like, by replacing the sodium methoxide in methanol used in the above-described reaction by the selected alkali-metal alkoxide in an alkanol.

PREPARATION 8.—3-KETO-11β-HYDROXY-4,17(20)-PREGNADIENE-21-OIC ACID ETHYL ESTER

In the same manner as described in Preparation 7, 3-keto-11β-hydroxy-4,17(20)-pregnadiene-21-oic acid ethyl ester is prepared by replacing the sodium methoxide in methanol used in the above-described example with sodium ethoxide in ethanol and 11β-hydroxy-21,21-dibromo-21-ethoxyoxalylprogesterone for the 11α-hydroxy-21,21-dibromo-21-ethoxyoxalylprogesterone used therein.

PREPARATION 9.—3,11-DIKETO-4,17(20)-PREGNADIENE-21-OIC ACID METHYL ESTER

To a solution of 5.90 grams (0.01 mole) of 11-keto-21,21-dibromo-21-ethoxyoxalylprogesterone, obtained according to the method given in Preparation 7, in 150 milliliters of methanol, was added 3.24 grams (0.06 mole) of commercial grade sodium methoxide. The resulting admixture was maintained for three hours at about 25 degrees centigrade, whereafter the whole was diluted with water and then extracted with two portions of methylene chloride. The methylene chloride extracts were dried with anhydrous sodium sulfate and the solvent was thereafter distilled at atmospheric pressure, leaving a quantitative yield of 3.60 grams of 3,11-diketo-4,17(20)-pregnadiene-21-oic acid methyl ester as an oil. This oil was dissolved in fifty milliliters of benzene and chromatographed over a column of 170 grams of Florisil synthetic magnesium silicate. The column was developed with 400-milliliter portions of solvent of the following composition and order: three portions of methylene chloride, five portions of methylene chloride plus five percent acetone, and one portion of acetone. The methylene chloride plus five percent acetone eluates were combined and the solvent was removed therefrom leaving 1.5 grams of crystalline 3,11-diketo-4,17(20)-pregnadiene-21-oic acid methyl ester which, after crystallization from acetone and Skellysolve B hexane hydrocarbons, melted at 213 to 214 degrees centigrade.

Analysis:
Calculated for C$_{22}$H$_{28}$O$_4$_____ C, 74.17; H, 7.92
Found_____ C, 74.37; H, 8.21

Similarly, other 3,11-diketo-4,17(20)-pregnadiene-21-oic acid esters are prepared wherein the ester is lower-alkyl, e. g., ethyl, propyl, butyl, amyl, hexyl, heptyl, octyl, or the like, by replacing the sodium methoxide in methanol used in the above-described reaction with the selected alkali-metal alkoxide in an alkanol.

PREPARATION 10.—3,11-DIKETO-4,17(20)-PREGNADIENE-21-OIC ACID

In exactly the same manner as given in Preparation 9, 3,11-diketo-4,17(20)-pregnadiene-21-oic acid was prepared from the sodium enolate of 11-keto-21-ethoxyoxalylprogesterone by substituting 3.4 grams (0.06 mole) of potassium hydroxide in ten milliliters of water for the sodium methoxide used in the above-described reaction, thus producing the potassium salt of the desired acid. The 3,11-diketo-4,17(20)-pregnadiene-21-oic acid was isolated by washing the reaction mixture with methylene chloride, acidifying with dilute hydrochloric acid and extracting the thus-produced oily precipitate with benzene. The benzene extract was washed with water, dried, and thereafter distilled at reduced pressure to remove the benzene. The residual 3,11-diketo-4,17(20)-pregnadiene-21-oic acid, after several crystallizations, melted at 255 to 260 degrees centigrade.

PREPARATION 11.—3-KETO-11α-HYDROXY-4,17(20)-PREGNADIENE-21-OIC ACID

In exactly the same manner as given in Preparation 7, 3-keto-11α-hydroxy-4,17(20)-pregnadiene-21-oic acid is prepared from 11α-hydroxy-21,21-dibromo-21-ethoxyoxalylprogesterone by substituting 3.4 grams (0.6 mole) of potassium hydroxide for the sodium methoxide in the above-described reaction. 3-keto-11α-hydroxy-4,17(20)-pregnadiene-21-oic acid is isolated from the reaction mixture by adding water thereto, washing with methylene chloride, and then acidifying the washed reaction mixture. The precipitated 3-keto-11α-hydroxy-4,17(20)-pregnadiene-21-oic acid is purified by separating the precipitated product and crystallizing the dried product from a solvent such as, for example, acetone plus Skellysolve B hexane hydrocarbons.

PREPARATION 12.—3-KETO-11β-HYDROXY-4,17(20)-PREGNADIENE-21-OIC ACID

In the same manner as described in Preparation 11, 3-keto-11β-hydroxy-4,17(20)-pregnadiene-21-oic acid is prepared by reacting 11β-hydroxy-21,21-dibromo-21-ethoxyoxalylprogesterone with a base, preferably an alkali-metal hydroxide or other alkali-metal base, in the presence of water, and thereafter acidifying the reaction mixture, as with dilute mineral acid, e. g., hydrochloric, sulfuric acid, or the like, to produce the free 3-keto-11β-hydroxy-4,17(20)-pregnadiene 21-oic acid.

*Example 1.—3-Ethylene glycol ketal of 3-keto-11α-hydroxy-4,17(20)-pregnadiene-21-oic acid methyl ester*

To a solution of 1.5 grams (0.0042 mole) of 3-keto-11α-hydroxy-4,17(20)-pregnadiene-21-oic acid methyl ester in 150 milliliters of benzene were added 7.5 milliliters of ethylene glycol and 0.150 gram of para-toluenesulfonic acid and the whole was then refluxed and stirred for 5.5 hours. The cooled solution was then washed with 100 milliliters of a one percent aqueous sodium bicarbonate solution whereafter the washed solution was poured over a column of 200 grams of Florisil magnesium silicate. The column was developed with 200-milliliter portions of solvents of the following composition and order: four of Skellysolve B hexane hydrocarbons plus four percent acetone, four of Skellysolve B plus six percent acetone, four of Skellysolve B plus ten percent acetone, four of Skellysolve B plus fifteen percent acetone, and finally, two portions of acetone. The last Skellysolve B plus ten percent acetone eluate and the first three Skellysolve B plus fifteen percent acetone eluate fractions were combined, the solvent removed therefrom, and the residual 3-ethylene glycol ketal of 3-keto-11α-hydroxy-4,17(20)-pregnadiene-21-oic acid methyl ester was recrystallized from a mixture of ethyl acetate and Skellysolve B hexane hydrocarbons to give 1.46 grams of crystals melting at 181 to 185 degrees centigrade. Further recrystallization of these crystals gave 1.25 grams of the 3-ethylene glycol ketal of 3-keto-11α-hydroxy-4,17(20)-pregnadiene-21-oic acid methyl ester melting at 184 to 188 degrees centigrade.

Analysis:
Calculated for C$_{24}$H$_{34}$O$_5$_____C, 71.65; H, 8.52
Found _____C, 71.69; H, 8.40
C, 71.86; H, 8.40

*Example 2.—3-Ethylene glycol ketal of 3-keto-11α-hydroxy-4,17(20)-pregnadiene-21-oic acid ethyl ester*

Following the procedure described in Example 1, the reaction of 3-keto-11α-hydroxy-4,17(20)-pregnadiene-21-oic acid ethyl ester with more than about one molar equivalent of ethylene glycol, in the presence of para-toluenesulfonic acid, is productive of the 3-ethylene glycol ketal of 3-keto-11α-hydroxy-4,17(20)-pregnadiene-21-oic acid ethyl ester.

Similarly, the 3-ethylene glycol ketal of other esters of 3-keto-11α-hydroxy-4,17(20)-pregnadiene-21-oic acid such as, for example, the propyl, butyl, amyl, hexyl, heptyl, octyl, or like ester, is prepared by reacting the selected alkyl ester of 3-keto-11α-hydroxy-4,17(20)-pregnadiene-21-oic acid with ethylene glycol according to the method described in Example 1 in the presence of an acid catalyst such as, for example, hydrogen chloride, benzene sulfonic acid, para-toluenesulfonic acid, or the like.

*Example 3.—3-Ethylene glycol ketal of 3-keto-11α-hydroxy - 4,17(20) - pregnadiene - 21 - oic acid methyl ester.*

A mixture of 7.5 grams (0.0215 mole) of 3-keto-11α-hydroxy - 4,17(20) - pregnadiene - 21 - oic acid methyl ester, 37.5 milliliters of ethylene glycol, and 0.75 gram of para-toluenesulfonic acid in 750 milliliters of dry benzene was refluxed with concomitant removal of the water of reaction for 5.5 hours. The cooled mixture was then stirred for five minutes with 500 milliliters of a one percent aqueous sodium bicarbonate solution whereafter the benzene layer was removed, dried over anhydrous sodium sulfate and the solvent then removed from the dried solution by distillation at reduced pressure. The residual solids were dissolved in fifty milliliters of hot ethyl acetate to which was then added 400 milliliters of hot Skellysolve B hexane hydrocarbons. The mixture was then cooled to room temperature and then chilled in a refrigerator at four degrees centigrade for four hours. The precipitated solids were filtered and dried in vacuo to yield 5.8 grams of the 3-ethylene glycol ketal of 3-keto-11α - hydroxy - 4,17(20) - pregnadiene - 21 - oic acid methyl ester melting at 175 to 182 degrees centigrade. Recrystallization of this material from ethyl acetate and Skellysolve B raised the melting point to 183 to 186 degrees centigrade. The rotation of the product $[\alpha]_D^{23}$ was plus 23 degrees in acetone.

*Example 4.—3-Trimethylene glycol ketal of 3-keto-11α-hydroxy - 4,17(20) - pregnadiene - 21 - oic acid methyl ester*

In the same manner as described in Example 1, reacting 3 - keto - 11α - hydroxy - 4,17(20) - pregnadiene - 21-oic acid methyl ester with trimethylene glycol in the presence of para-toluenesulfonic acid is productive of the 3-trimethylene glycol ketal of 3,11-diketo-4,17(20)-pregnadiene-21-oic acid methyl ester.

Similarly, other 3-ketals of the methyl and other esters of 3 - keto - 11α - hydroxy - 4,17(20) - pregnadiene - 21-oic acid and 3-keto-11β-hydroxy-4,17(20)-pregnadiene-21-oic acid are produced by reaction of a selected ester of one of the above-described steroid acids, especially the methyl, ethyl, propyl, isopropyl, butyl, amyl, hexyl, heptyl, or octyl ester, with a glycol such as, for example, ethylene glycol, propylene glycol, trimethylene glycol, an alkyl substituted ethylene glycol, propylene glycol, or trimethylene glycol, or the like, in the presence of an acid catalyst such as, for example, para-toluenesulfonic acid, hydrogen chloride, sulfuric acid, or the like.

*Example 5.—3-Ethylene glycol ketal of 3-keto-11β-hydroxy - 4,17(20) - pregnadiene - 21 - oic acid methyl ester*

The 3-ethylene glycol ketal of 3-keto-11β-hydroxy-4,17(20)-pregnadiene-21-oic acid methyl ester is prepared by mixing 3-keto-11β-hydroxy-4,17(20)-pregnadiene-2-oic acid methyl ester with a large volume of ethylene glycol, thereby dissolving the steroid therein, and then adding a catalytic amount of para-toluenesulfonic acid at room temperature. After allowing the mixture to remain at room temperature for 48 hours, the catalyst is neutralized with sodium bicarbonate and the ethylene glycol removed by distillation at room temperature at high vacuum. Dissolving the residue in chloroform which is then washed with dilute sodium bicarbonate and then water, dried, and the chloroform evaporated therefrom, leaves a residue of the 3-ethylene glycol ketal of 3 - keto - 11β - hydroxy - 4,17(20) - pregnadiene-21-oic acid methyl ester which, when crystallized repeatedly from acetone and Skellysolve B hexane hydrocarbons, melts at 167 to 169 degrees centigrade and has an $[\alpha]_D^{23}$ of plus four degrees.

Analysis:
Calculated for $C_{24}H_{34}O_4$_____C, 71.61; H, 8.51
Found _____C, 71.63; H, 8.78

*Example 6.—3-Ethylene glycol ketal of 3,11-diketo-4,17(20)-pregnadiene-21-oic acid methyl ester*

To a solution of 1.5 grams (0.0042 mole) of 3,11-diketo-4,17(20)-pregnadiene-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadiene-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17(20)-pregnadiene-21-oic acid methyl ester. The yield of product was 87 percent of the theoretical calculated on the amount of starting steroid which reacted.

Analysis:
Calculated for $C_{24}H_{32}O_5$_____ C, 71.94; H, 8.05
Found _____ C, 71.90; H, 7.95

Similarly, the 3-ethylene glycol ketals of other alkyl esters of 3,11-diketo-4,17(20)-pregnadiene-21-oic acid such as, for example, the methyl ester, the ethyl, propyl, butyl, amyl, hexyl, heptyl, octyl, or like ester, especially the 3-ethylene glycol ketal of 3,11-diketo-4,17(20)-pregnadiene-21-oic acid methyl ester, are prepared by reacting the selected alkyl ester of 3,11-diketo-4,17(20)-pregnadiene-21-oic acid with ethylene glycol according to the method described in Example 6 in the presence of an acid catalyst such as, for example, anhydrous hydrogen chloride, benzene sulfonic acid, para-toluenesulfonic acid, or the like.

*Example 7.—3-Ethylene glycol ketal of 3-keto-11α-hydroxy-4,17(20)-pregnadiene-21-oic acid*

The 3-ethylene glycol ketal of 3-keto-11α-hydroxy-4,17(20)-pregnadiene-21-oic acid is prepared by allowing a mixture of 3-keto-11α-hydroxy-4,17(20)-pregnadiene 21-oic acid and a large molar excess of ethylene glycol, to which has been added a small amount of para-toluenesulfonic acid, to stand at room temperature for 48 hours. The excess ethylene glycol is then distilled at reduced pressure and the distillation residue washed with dilute sodium hydroxide. The aqueous layer is then separated and acidified thereby precipitating 3-ethylene glycol ketal of 3-keto-11α-hydroxy-4,17(20)-pregnadiene-21-oic acid along with small amounts of starting material which is separated therefrom by repeated crystallization of the mixture. The material not extracted with the dilute base contains some steroid whose acid radical is esterified by the ethylene glycol. Treating this material with dilute sodium hydroxide in methanol and water followed by liberation of the free acid by neutralization of the mixture with very dilute acid is productive of the 3-ethylene glycol ketal of 3-keto-11α-hydroxy-4,17(20)-pregnadiene-21-oic acid which may be purified in the same manner as the precipitated reaction product described above.

Similarly, other 3-glycol ketals of 3-keto-11α-hydroxy-4,17(20)-pregnadiene-21-oic acid are prepared by substituting the selected 3-glycol ketal of 3-keto-11α-hydroxy-4,17(20)-pregnadiene-21-oic acid for the 3-ethylene glycol ketal thereof in the above-described reaction.

*Example 8. — 3-Ethylene glycol ketal of 3-keto-11β-hydroxy-4,17(20)-pregnadiene-21-oic acid*

In exactly the same manner as described in Example 7, the 3-ethylene glycol ketal of 3-keto-11β-hydroxy-4,17(20)-pregnadiene 21-oic acid is prepared by substituting 3 - keto-11β-hydroxy-4,17(20)-pregnadiene-21-oic acid as the starting material in the reaction described therein.

*Example 9.—3-Trimethylene glycol ketal of 3,11-diketo-4,17(20)-pregnadiene-21-oic acid*

In the same manner as described in Example 7, reacting 3,11-diketo-4,17(20)-pregnadiene-21-oic acid with trimethylene glycol in the presence of an acid catalyst is productive of the 3-trimethylene glycol ketal of 3,11-diketo-4,17(20)-pregnadiene-21-oic acid.

Similarly, other 3-ketals of the compounds of Examples 1 to 9 are produced by the reaction of the selected acid or ester thereof, especially the methyl, ethyl, propyl, butyl, amyl, hexyl, heptyl, or octyl ester thereof, with a glycol such as, for example, ethylene glycol, propylene glycol, trimethylene glycol, an alkyl substituted ethylene glycol, propylene glycol, or trimethylene gylcol, or the like, in the presence of an acid catalyst, such as, for example, para-toluenesulfonic acid, hydrogen chloride, sulfuric acid or the like.

It is to be understood that the invention is not to be limited to the exact details or exact compounds shown and described as obvious modifications and equivalents will be apparent to one skilled in the art and the invention is therefore to be limited only by the scope of the appended claims.

We claim:

1. A compound represented by the following formula:

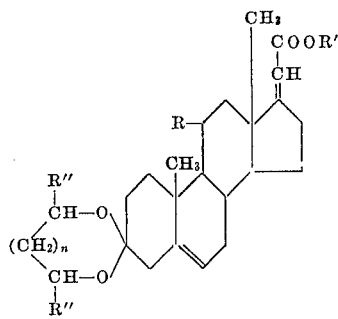

wherein R is selected from the group consisting of an α-hydroxy group, a β-hydroxy group, and a ketonic oxygen, wherein R', R'' and R''' are selected from the group consisting of hydrogen and hydrocarbon radicals containing less than nine carbon atoms and $n$ is selected from the whole numbers zero and one and wherein R'' and R''' together contain less than 9 carbon atoms.

2. A compound represented by the following formula:

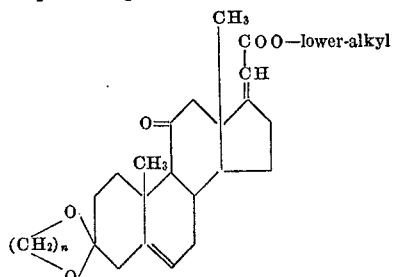

wherein $n$ is a whole number from two to three, inclusive.

3. A compound of claim 2 wherein $n$ is 2.

4. A compound represented by the following formula:

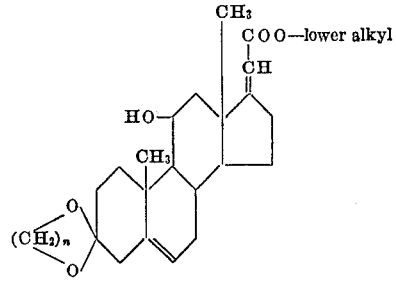

wherein $n$ is a whole number from two to three, inclusive.

5. A compound of claim 4 wherein $n$ is 2.

6. The 3-ethylene glycol ketal of 3-keto-11α-hydroxy-4,17(20)-pregnadiene-21-oic acid methyl ester.

7. The 3-ethylene glycol ketal of 3-keto-11α-hydroxy-4,17(20)-pregnadiene-21-oic acid ethyl ester.

8. The 3-ethylene glycol ketal of 3-keto-11β-hydroxy-4,17(20)-pregnadiene-21-oic acid methyl ester.

9. The 3-ethylene glycol ketal of 3,11-diketo-4,17(20)-pregnadiene-21-oic acid methyl ester.

10. The 3-ethylene glycol ketal of 3,11-diketo-4,17(20)-pregnadiene-21-oic acid ethyl ester.

No references cited.